(12) United States Patent  
Yamada

(10) Patent No.: US 12,149,810 B2  
(45) Date of Patent: Nov. 19, 2024

(54) IMAGING DEVICE

(71) Applicant: Panasonic Intellectual Property Management Co., Ltd., Osaka (JP)

(72) Inventor: Junya Yamada, Osaka (JP)

(73) Assignee: PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/093,637

(22) Filed: Jan. 5, 2023

(65) Prior Publication Data

US 2023/0224563 A1   Jul. 13, 2023

(30) Foreign Application Priority Data

Jan. 7, 2022   (JP) .................................. 2022-001615  
Dec. 8, 2022   (JP) .................................. 2022-196021

(51) Int. Cl.  
*H04N 23/54*   (2023.01)  
*H04N 23/695*   (2023.01)

(52) U.S. Cl.  
CPC ........... *H04N 23/54* (2023.01); *H04N 23/695* (2023.01)

(58) Field of Classification Search  
CPC ....... H04N 23/51; H04N 23/54; H04N 23/695  
See application file for complete search history.

(56) References Cited

U.S. PATENT DOCUMENTS

| | | | |
|---|---|---|---|
| 7,193,653 B2 * | 3/2007 | Lee ........................ | H04N 23/50 348/E5.025 |
| 11,902,647 B2 * | 2/2024 | Seo ........................ | H04N 23/54 |
| 2017/0353635 A1 * | 12/2017 | Shin ....................... | H04N 23/51 |
| 2020/0225562 A1 * | 7/2020 | Zheng .................... | H04N 23/51 |

FOREIGN PATENT DOCUMENTS

| | | |
|---|---|---|
| JP | 2000-350058 | 12/2000 |
| JP | 2014-235182 | 12/2014 |
| JP | 2014-235256 | 12/2014 |

* cited by examiner

*Primary Examiner* — Amy R Hsu  
(74) *Attorney, Agent, or Firm* — Wenderoth, Lind & Ponack, L.L.P.

(57) ABSTRACT

An imaging device includes an imaging unit that captures an object, a first housing, a second housing that supports the imaging unit and is rotatably supported in a tilt direction with respect to the first housing in order to change an imaging direction of the imaging unit, and a tilt stopper that is in contact with both the first housing and the second housing to regulate rotation of the second housing in the tilt direction with respect to the first housing.

9 Claims, 8 Drawing Sheets

IMAGING DEVICE

BACKGROUND

1. Technical Field

The present disclosure relates to an imaging device for capturing an object.

2. Description of the Related Art

As one of imaging devices for capturing an object, a pan tilt zoom (PTZ) camera capable of pan rotation, tilt rotation, and zoom processing is known (See, for example, Unexamined Japanese Patent Publication No. 2000-350058.).

The PTZ camera includes a base, a first housing rotatably supported in a pan direction with respect to the base, a second housing rotatably supported in a tilt direction with respect to the first housing, and an imaging unit supported by the second housing. In the PTZ camera, an imaging direction of the imaging unit can be changed to an arbitrary direction by rotating the first housing in the pan direction with respect to the base and rotating the second housing in the tilt direction with respect to the first housing.

SUMMARY

However, in the case of a PTZ camera having no deceleration mechanism, pan rotation and tilt rotation may not be locked in a non-energized state. Therefore, for example, at the time of transportation of the PTZ camera or the like, there is a problem that an impact may be applied to the internal components of the PTZ camera or the like due to unintended pan rotation and tilt rotation.

The present disclosure provides an imaging device capable of regulating unintended rotation of a second member with respect to a first member.

An imaging device according to the present disclosure includes: an imaging unit that captures an object; a first member; a second member that supports the imaging unit and is rotatably supported in a predetermined direction with respect to the first member in order to change an imaging direction of the imaging unit; and a regulation member that regulates rotation of the second member with respect to the first member in the predetermined direction by coming into contact with both the first member and the second member.

According to the imaging device of the present disclosure, unintended rotation of the second member with respect to the first member can be regulated.

DETAILED DESCRIPTION

Hereinafter, exemplary embodiments are described below in detail with reference to the drawings as appropriate. However, unnecessarily detailed description may be omitted. For example, the detailed description of already well-known matters and the overlap description of substantially the same configurations may be omitted. This is to avoid an unnecessarily redundant description below and to facilitate understanding by those skilled in the art.

Note that the inventors provide the attached drawings and the following description for those skilled in the art to fully understand the present disclosure, and does not intend that the attached drawings and the following description limit the subject matter as described in the appended claims.

Exemplary Embodiment

1. Overview of Imaging Device

Figure 1:
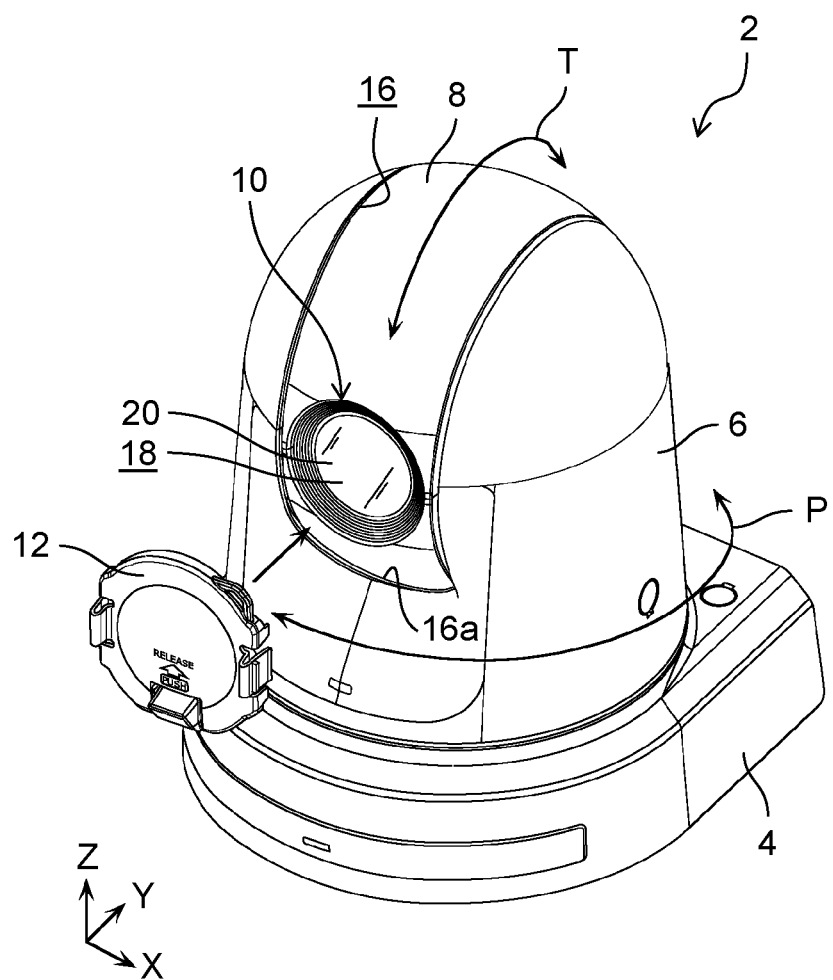
FIG. 1 is a perspective view illustrating an imaging device according to an exemplary embodiment.
Figure 2:
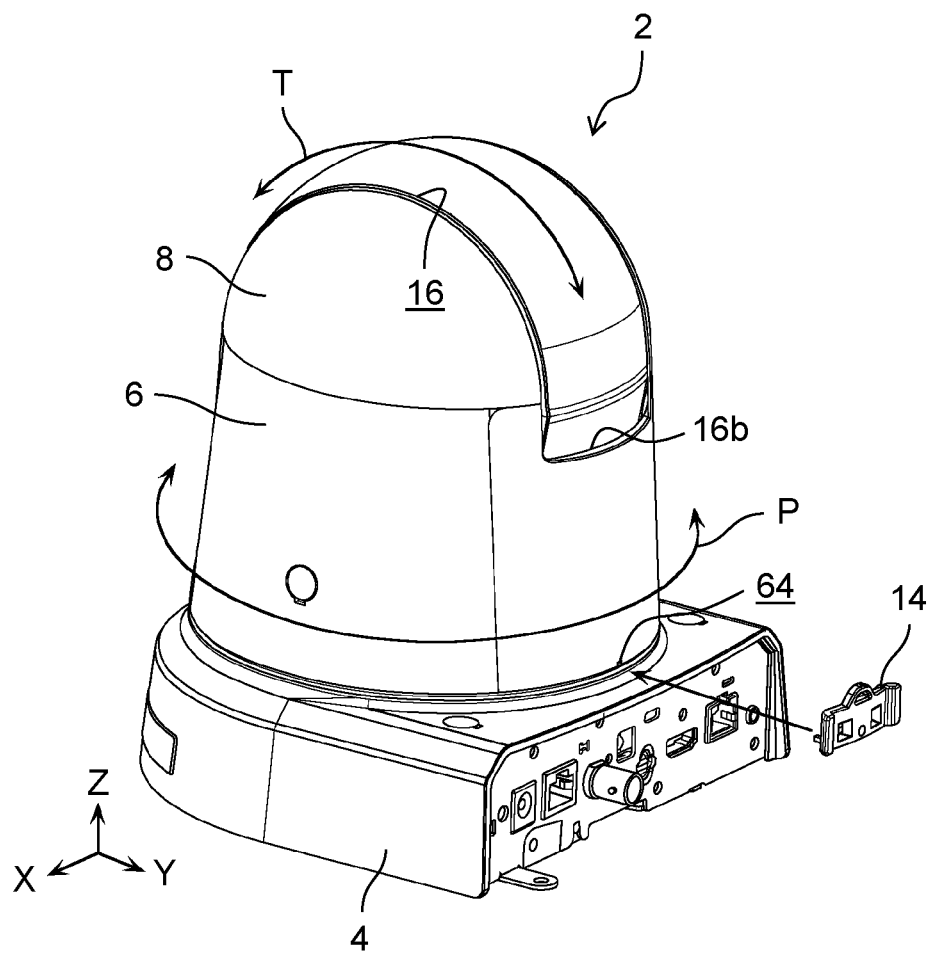
FIG. 2 is a perspective view illustrating the imaging device according to the exemplary embodiment in a state of being viewed from an angle different from that in FIG. 1.
Figure 3:
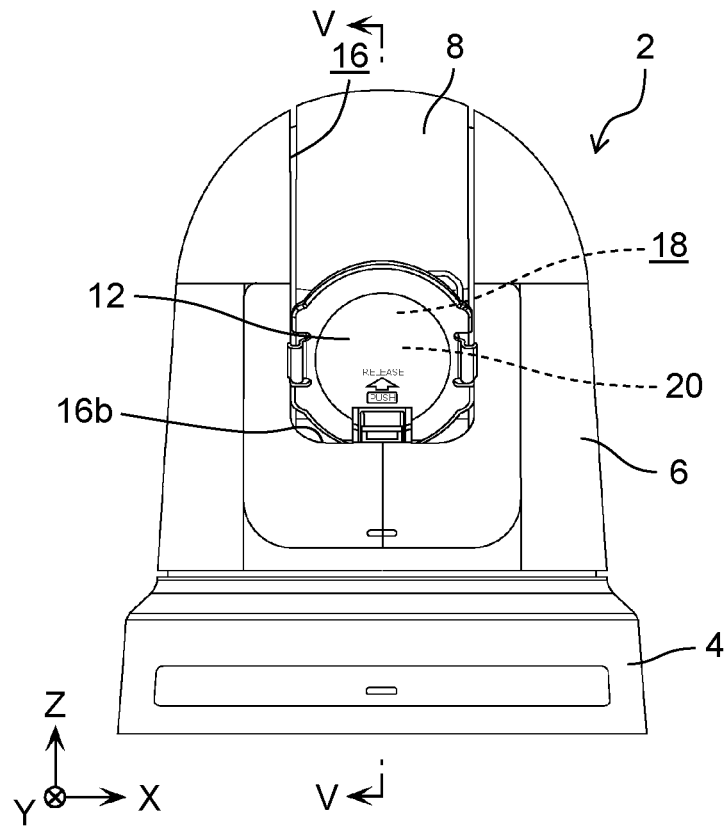
FIG. 3 is a front view illustrating the imaging device according to the exemplary embodiment.
Figure 4:
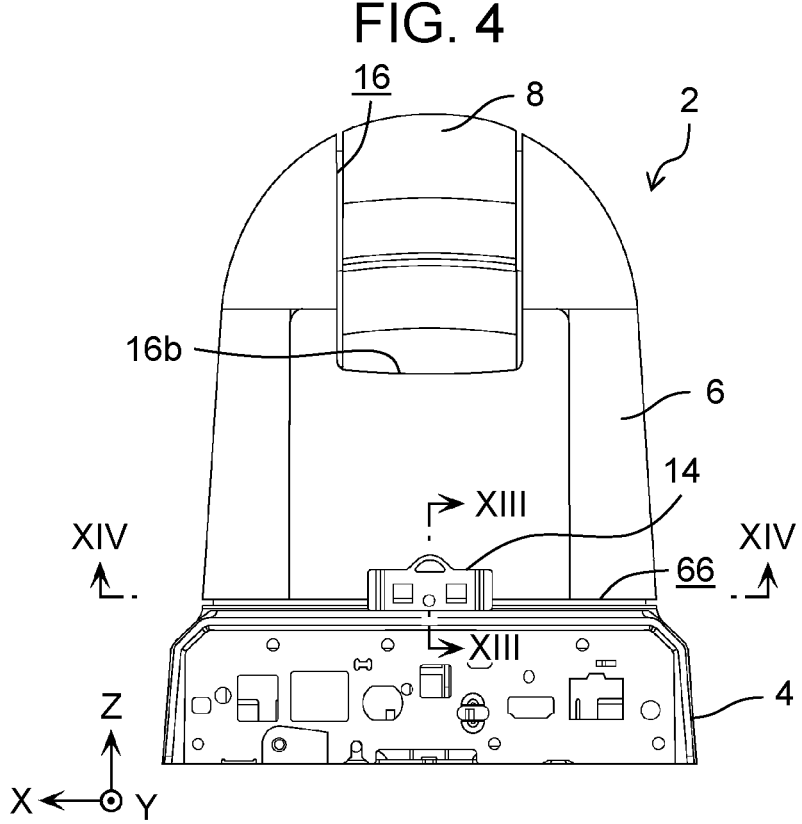
FIG. 4 is a rear view illustrating the imaging device according to the exemplary embodiment.
Figure 5:
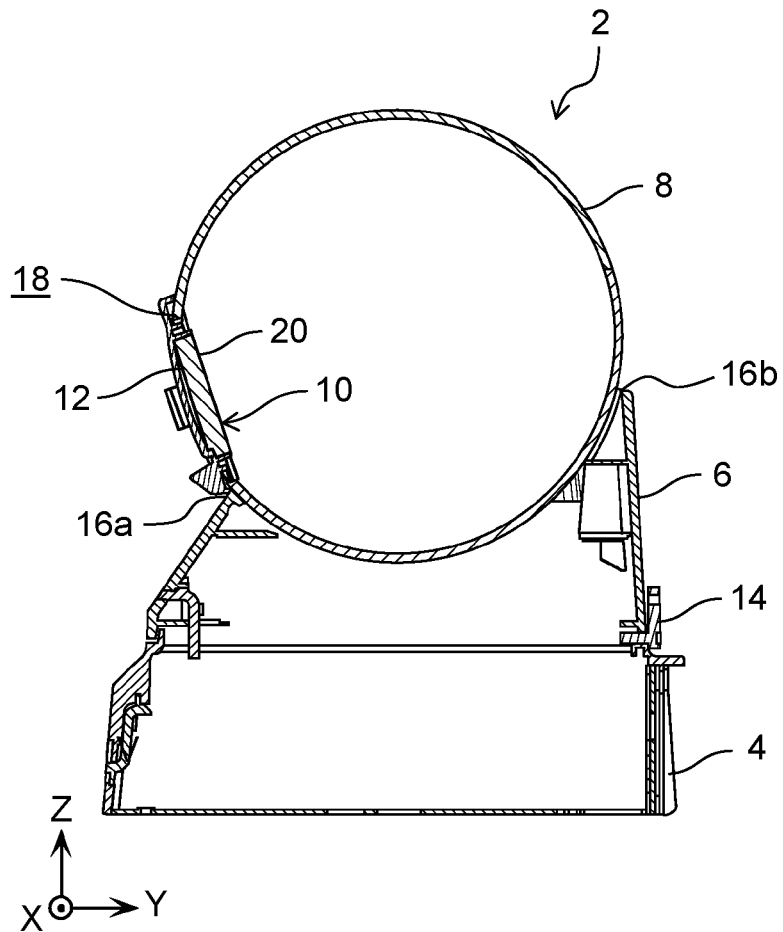
FIG. 5 is a cross-sectional view of the imaging device according to the exemplary embodiment taken along line V-V in FIG. 3.

First, an outline of imaging device 2 according to an exemplary embodiment will be described with reference to FIGS. 1 to 5. FIG. 1 is a perspective view illustrating imaging device 2 according to the exemplary embodiment. FIG. 2 is a perspective view illustrating imaging device 2 according to the exemplary embodiment as viewed from an angle different from that in FIG. 1. FIG. 3 is a front view illustrating imaging device 2 according to the exemplary embodiment. FIG. 4 is a rear view illustrating imaging device 2 according to the exemplary embodiment. FIG. 5 is a cross-sectional view of imaging device 2 according to the exemplary embodiment taken along line V-V in FIG. 3.

Note that, in FIGS. 1 to 5, a left-right direction of imaging device 2 is an X-axis, a front-rear direction of imaging device 2 is a Y-axis, and a vertical direction of imaging device 2 is a Z-axis. Furthermore, for convenience of description, various components and the like disposed inside imaging device 2 are not illustrated in FIG. 5.

As illustrated in FIGS. 1 to 4, imaging device 2 according to the exemplary embodiment is a PTZ camera capable of pan rotation, tilt rotation, and zoom processing. The pan rotation means rotation in a horizontal direction (hereinafter, referred to as a "pan direction") indicated by arrow P in FIGS. 1 and 2, that is, rotation about a rotation axis parallel to a vertical direction (Z-axis direction). The tilt rotation means rotation in the vertical direction (hereinafter, referred to as a "tilt direction") indicated by arrow T in FIGS. 1 and 2, that is, rotation about a rotation axis parallel to a horizontal plane (XY plane). The zoom processing means that an object is enlarged (zoom-in) or reduced (zoom-out) and captured. Furthermore, the pan rotation and the tilt rotation of imaging device 2 according to the present disclosure are realized by a driving force of a direct drive motor. Note that the direct drive motor is a motor that incorporates a bearing that directly receives a target to be rotationally driven and drives the target to be rotationally driven without a reduction mechanism such as a gear.

As illustrated in FIGS. 1 to 4, imaging device 2 includes base 4, first housing 6, second housing 8, imaging unit 10, tilt stopper 12, and pan stopper 14. Imaging device 2 is used as a television camera that is remotely controlled in a broadcasting station such as a television, for example.

Base 4 is a member serving as a base of imaging device 2, and is installed on an installation surface such as a desk surface or a ceiling surface, for example. As illustrated in FIG. 5, base 4 is formed in a hollow shape. Although not illustrated, a direct drive motor as a drive source for pan rotation of first housing 6 is disposed inside base 4. Furthermore, although not illustrated, a control unit for controlling imaging unit 10, the direct drive motor, and the like is disposed inside base 4.

First housing 6 is formed in a dome shape as viewed in an X-axis direction as illustrated in FIGS. 1 and 2, and has a substantially U shape with respect to base 4 as viewed in a Y-axis direction as illustrated in FIG. 3. First housing 6 is supported so as to be rotatable in the pan direction with respect to base 4. When viewed from the X-axis direction in FIGS. 1 and 2, substantially U-shaped cutout 16 is formed in first housing 6 from one side part to the other side part of first housing 6 via an upper end. As illustrated in FIGS. 1, 3, and 5, one end 16*a* in a longitudinal direction of cutout 16 is disposed on one side of first housing 6. Furthermore, as illustrated in FIGS. 2, 4, and 5, the other end 16*b* of cutout 16 in the longitudinal direction is disposed on the other side part of first housing 6. Here, first housing 6 is rotatable by, for example, 360° in the pan direction with respect to base 4 by a driving force from the direct drive motor disposed inside base 4. When first housing 6 rotates in the pan direction with respect to base 4, base 4 constitutes a first member, and first housing 6 constitutes a second member. In this case, first housing 6 supports imaging unit 10 via second housing 8. Furthermore, although not illustrated, a direct drive motor as a drive source for tilting and rotating second housing 8 is disposed inside first housing 6.

Second housing 8 is formed in an annular shape, and is disposed in cutout 16 of first housing 6. Second housing 8 is rotatably supported in the tilt direction with respect to first housing 6. Second housing 8 is rotatable by, for example, 180° in the tilt direction with respect to first housing 6 by a driving force from the direct drive motor disposed inside first housing 6. As illustrated in FIG. 1, circular opening 18 is formed on a side surface of second housing 8. When second housing 8 rotates in the tilt direction with respect to first housing 6, first housing 6 constitutes a first member, and second housing 8 constitutes a second member. Furthermore, in this case, second housing 8 supports imaging unit 10.

Imaging unit 10 is a camera or a camera unit for capturing an object, and is supported by second housing 8. Imaging unit 10 includes circular lens 20 and the like. Note that, for convenience of description, various components other than lens 20 in imaging unit 10 are not illustrated in FIG. 5. As illustrated in FIG. 1, lens 20 is disposed in opening 18 of second housing 8, and is exposed to the outside of second housing 8 through opening 18. A video signal output from imaging unit 10 is input to a control unit (not illustrated) inside base 4 via a cable (not illustrated). As second housing 8 rotates by 180° in the tilt direction with respect to first housing 6, imaging unit 10 moves from one end 16*a* to the other end 16*b* of cutout 16 (alternatively, from the other end 16*b* to the one end 16*a*) along the longitudinal direction of cutout 16 of first housing 6.

In imaging device 2 described above, an imaging direction of imaging unit 10 can be changed to any direction by rotating first housing 6 in the pan direction with respect to base 4 and rotating second housing 8 in the tilt direction with respect to first housing 6.

Tilt stopper 12 is a regulation member for regulating rotation of first housing 6 in the tilt direction with respect to second housing 8. As illustrated in FIGS. 1, 3, and 5, tilt stopper 12 is detachably supported by opening 18 of second housing 8 so as to cover opening 18 of second housing 8. That is, tilt stopper 12 is also used as a lens cap for protecting lens 20 of imaging unit 10. A specific configuration of tilt stopper 12 will be described later.

Pan stopper 14 is a regulation member for regulating rotation of first housing 6 in the pan direction with respect to base 4. As illustrated in FIGS. 2, 4, and 5, pan stopper 14 is detachably supported on a side surface of first housing 6. A specific configuration of pan stopper 14 will be described later.

2. Configuration of Tilt Stopper

Figure 6:
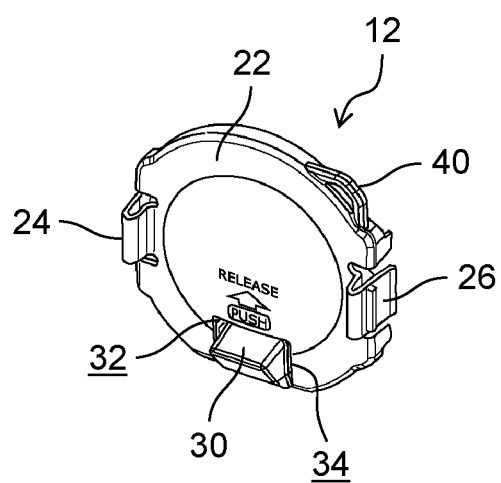
FIG. 6 is a perspective view illustrating a tilt stopper according to the exemplary embodiment.
Figure 7:
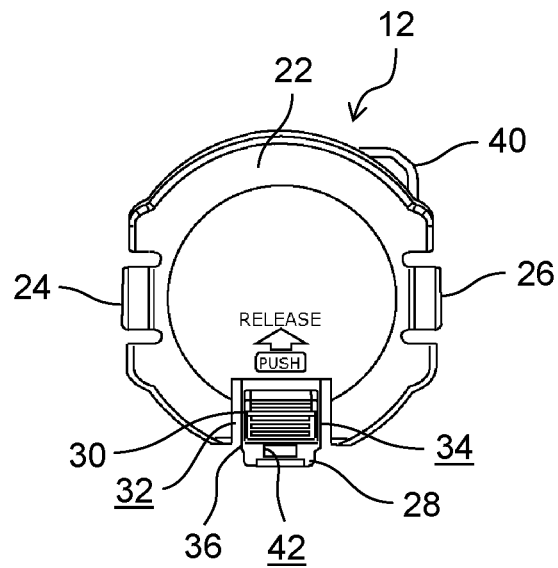
FIG. 7 is a front view illustrating the tilt stopper according to the exemplary embodiment.
Figure 8:
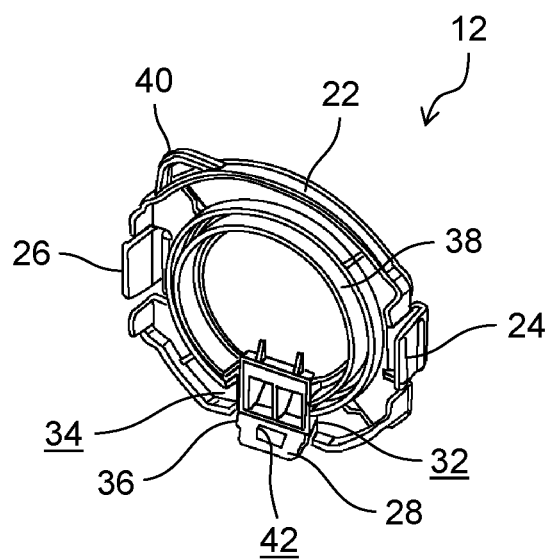
FIG. 8 is a perspective view illustrating the tilt stopper according to the exemplary embodiment in a state of being viewed from an angle different from that in FIG. 6.

The configuration of tilt stopper 12 according to the exemplary embodiment will be described with reference to FIGS. 6 to 8. FIG. 6 is a perspective view illustrating tilt stopper 12 according to the exemplary embodiment. FIG. 7 is a front view illustrating tilt stopper 12 according to the exemplary embodiment. FIG. 8 is a perspective view illustrating tilt stopper 12 according to the exemplary embodiment when viewed from an angle different from that in FIG. 6.

As illustrated in FIGS. 6 to 8, tilt stopper 12 includes body 22, a pair of claw parts 24, 26, insertion part 28, and pressed part 30. Tilt stopper 12 is made of an elastic material such as resin, for example.

Body 22 is formed in a substantially disk shape. Fixing piece 36 formed by a pair of slits 32, 34 is formed at a lower end (an end on a lower side in FIG. 7) of body 22. Fixing piece 36 can be elastically bent. As illustrated in FIG. 8, substantially C-shaped rib 38 is formed on a back surface (a surface facing lens 20) of body 22. Furthermore, hook 40 is formed at an upper end (an end on an upper side in FIG. 7) of the body 22.

The pair of claw parts 24, 26 is formed at left and right (left and right in FIG. 7) both ends of body 22, respectively. The pair of claw parts 24, 26 can be elastically bent.

Insertion part 28 is formed in a thin plate shape and is disposed at a lower end of fixing piece 36. Engagement hole 42 (an example of a first engagement part) having a substantially rectangular shape is formed in insertion part 28. As illustrated in FIGS. 7 and 8, engagement hole 42 is located between the pair of claw parts 24, 26.

Pressed part 30 is formed in a substantially triangular prism shape and protrudes from a surface (a surface opposite to lens 20) of fixing piece 36. When the user applies an external force in a pushing direction to pressed part 30, pressed part 30 is pressed by the external force, and fixing piece 36 (that is, insertion part 28) can be elastically bent.

Figure 9:
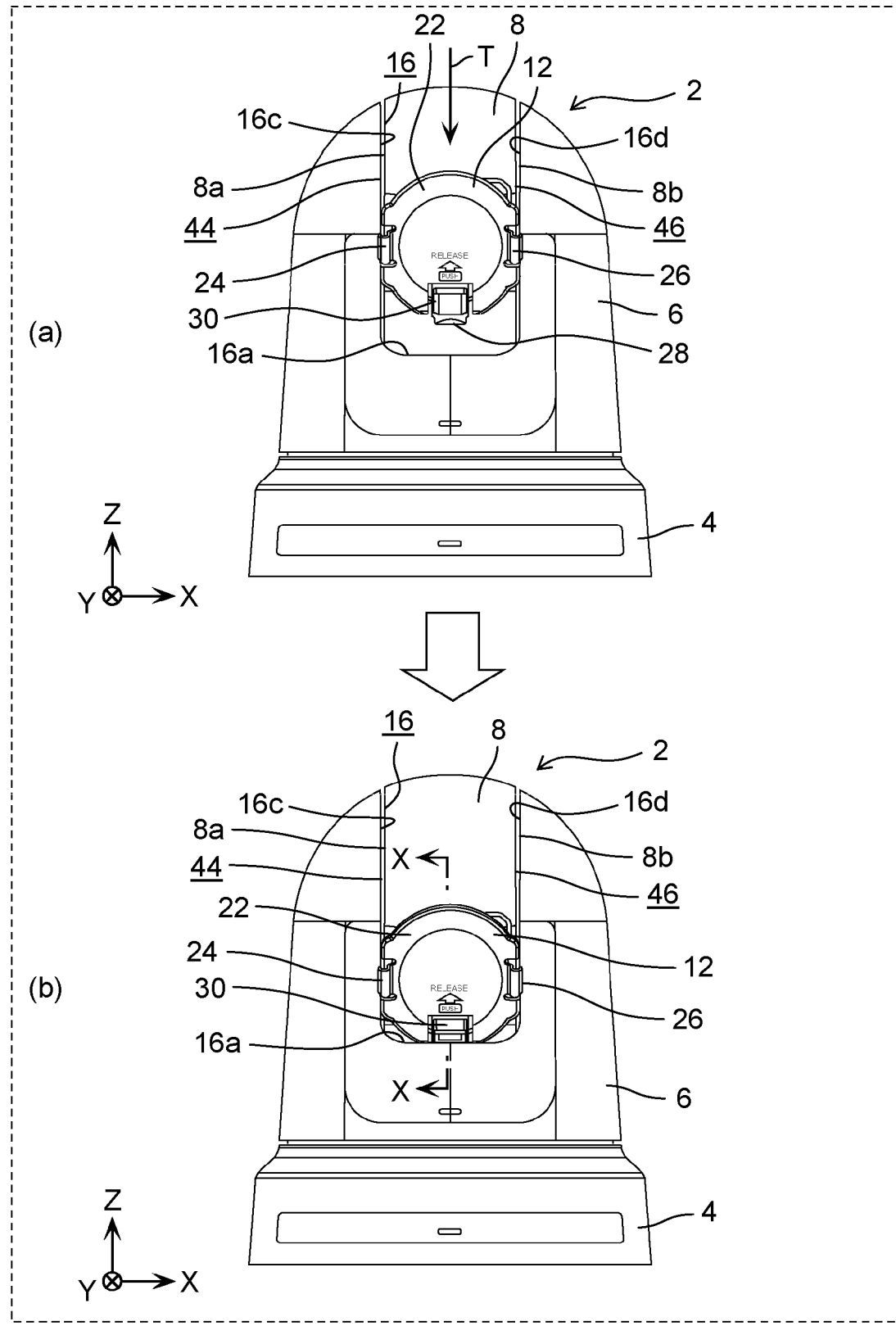
FIG. 9 is a diagram for explaining a method of using the tilt stopper according to the exemplary embodiment.
Figure 10:
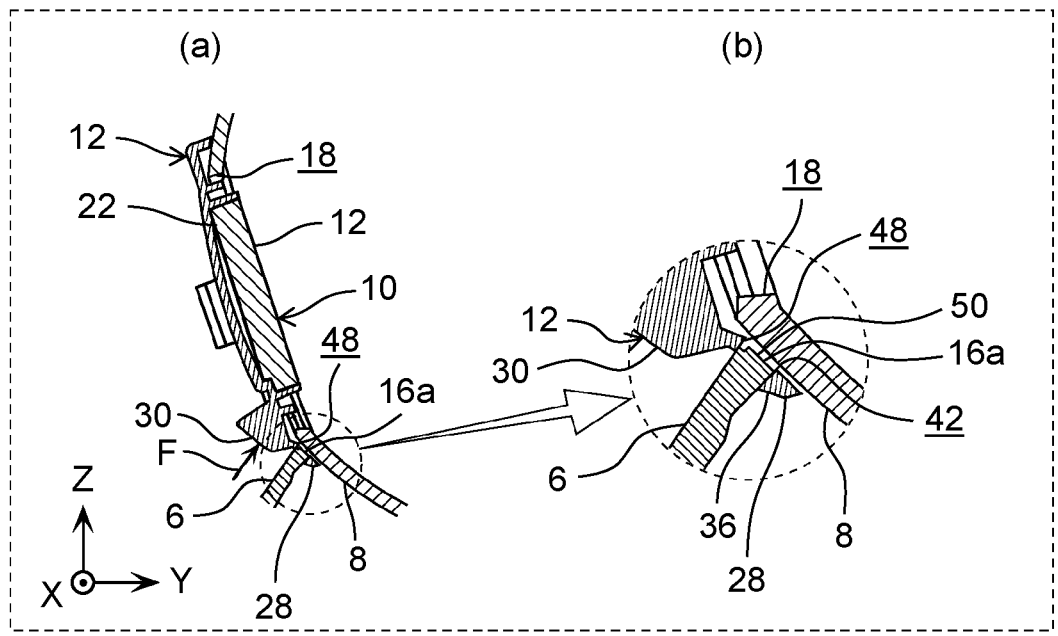
FIG. 10 is a cross-sectional view of a main part of the imaging device according to the exemplary embodiment taken along line X-X in part (b) of FIG. 9.

Hereinafter, a method of using the tilt stopper 12 will be described with reference to FIGS. 9 and 10. FIG. 9 is a diagram for explaining a method of using tilt stopper 12 according to the exemplary embodiment. FIG. 10 is a cross-sectional view of a main part of imaging device 2 according to the exemplary embodiment taken along line X-X in part (b) of FIG. 9. Note that part (b) of FIG. 10 is an enlarged cross-sectional view of a main part of a region surrounded by a broken line circle in part (a) of FIG. 10.

First, as illustrated in part (a) of FIG. 9, tilt stopper 12 is disposed in opening 18 of second housing 8. At this time, rib 38 of body 22 is detachably supported by an outer peripheral part of lens 20 of imaging unit 10. Furthermore, claw part 24 is inserted into gap 44 between edge 16c extending in the longitudinal direction of cutout 16 of first housing 6 and edge 8a of second housing 8 facing edge 16c of cutout 16, and is detachably engaged with edge 16c of cutout 16. Claw part 26 is inserted into gap 46 between edge 16d (an edge opposite to edge 16c) extending in the longitudinal direction of cutout 16 of first housing 6 and edge 8b of second housing 8 facing edge 16d of cutout 16, and is detachably engaged with edge 16d of cutout 16. Accordingly, tilt stopper 12 is detachably supported by opening 18 of second housing 8 so as to cover opening 18 of second housing 8.

Next, second housing 8 is rotated in the tilt direction with respect to first housing 6 in a direction indicated by arrow T in part (a) of FIG. 9. Accordingly, as illustrated in part (b) of FIG. 9 and part (a) of FIG. 10, tilt stopper 12 (that is, imaging unit 10) is positioned at one end 16a of cutout 16 of first housing 6.

At this time, as illustrated in part (b) of FIG. 10, insertion part 28 of tilt stopper 12 is inserted into gap 48 (an example of the recess) formed between one end 16a of cutout 16 of first housing 6 and a peripheral edge part of opening 18 of second housing 8. Engagement projection 50 (an example of a second engagement part) projecting toward gap 48 is formed at one end 16a of cutout 16, and engagement hole 42 of insertion part 28 inserted into gap 48 is detachably engaged with engagement projection 50. As a result, since tilt stopper 12 comes into contact with both first housing 6 and second housing 8, the rotation of second housing 8 in the tilt direction with respect to first housing 6 is regulated. Furthermore, since engagement hole 42 of insertion part 28 is positioned between the pair of claw parts 24, 26, the engagement between engagement hole 42 and engagement projection 50 can be stabilized.

Note that when the regulation of the rotation of second housing 8 in the tilt direction with respect to first housing 6 is released, insertion part 28 is elastically bent by the user pressing pressed part 30 with a finger in a direction indicated by arrow F in (a) of FIG. 10. As a result, the engagement between engagement hole 42 of insertion part 28 and engagement projection 50 is released, and second housing 8 can rotate in the tilt direction with respect to first housing 6.

3. Configuration of Pan Stopper

Figure 11:
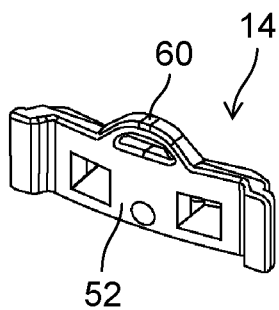
FIG. 11 is a perspective view illustrating a pan stopper according to the exemplary embodiment.
Figure 12:
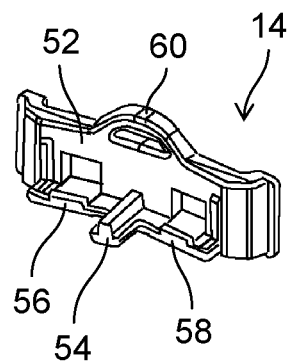
FIG. 12 is a perspective view illustrating the pan stopper according to the exemplary embodiment in a state of being viewed from an angle different from that in FIG. 11.

A configuration of pan stopper 14 according to the exemplary embodiment will be described with reference to FIGS. 11 and 12. FIG. 11 is a perspective view illustrating pan stopper 14 according to the exemplary embodiment. FIG. 12 is a perspective view illustrating pan stopper 14 according to the exemplary embodiment when viewed from an angle different from that in FIG. 11.

As illustrated in FIGS. 11 and 12, pan stopper 14 includes body 52, insertion part 54, and a pair of claw parts 56, 58. Pan stopper 14 is made of an elastic material such as resin.

Body 52 is formed in a substantially rectangular plate shape. Hook 60 is formed at an upper end (an end on an upper side in FIGS. 11 and 12) of body 52. For example, both ends of a strap (not illustrated) are fastened to hook 40 of tilt stopper 12 and hook 60 of pan stopper 14, respectively, so that tilt stopper 12 and pan stopper 14 can be connected via the strap. As a result, it is possible to suppress the loss of tilt stopper 12 and pan stopper 14.

Insertion part 54 is formed in a rod shape and protrudes from a back surface (a surface on a side facing first housing 6) of body 52. As illustrated in FIGS. 11 and 12, insertion part 54 is positioned between the pair of claw parts 56, 58.

The pair of claw parts 56, 58 is formed on both left and right sides (left and right in FIGS. 11 and 12) of insertion part 54, respectively, on the back surface of body 52. The pair of claw parts 56, 58 can be elastically bent.

Figure 13:
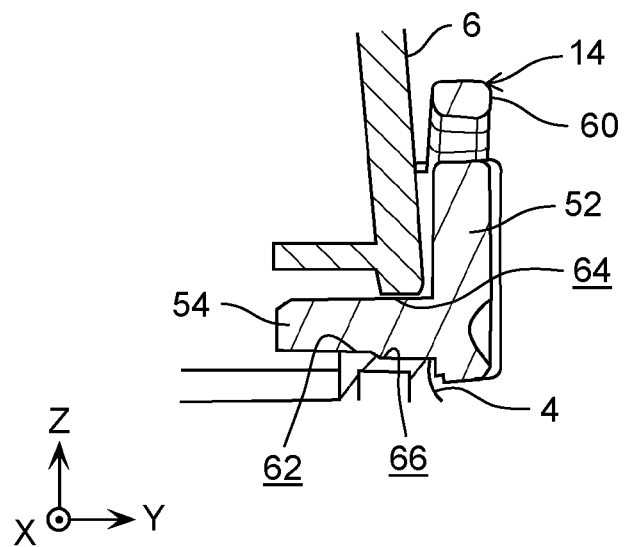
FIG. 13 is a cross-sectional view of a main part of the imaging device according to the exemplary embodiment taken along line XIII-XIII in FIG. 4.
Figure 14:
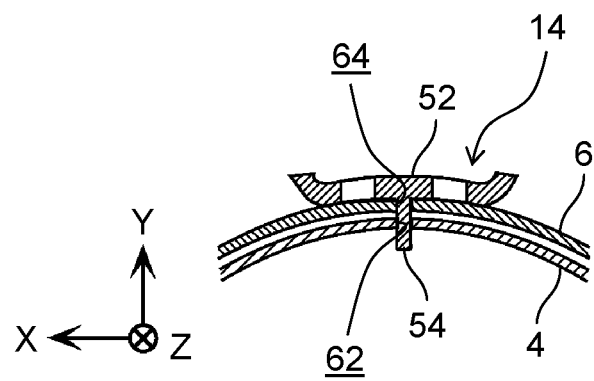
FIG. 14 is a cross-sectional view of a main part of the imaging device according to the exemplary embodiment taken along line XIV-XIV in FIG. 4.

Hereinafter, a method of using pan stopper 14 will be described with reference to FIGS. 2, 13, and 14. FIG. 13 is a cross-sectional view of a main part of imaging device 2 according to the exemplary embodiment, taken along line XIII-XIII in FIG. 4. FIG. 14 is a cross-sectional view of a main part of imaging device 2 according to the exemplary embodiment, taken along line XIV-XIV in FIG. 4.

First, as illustrated in FIG. 2, first housing 6 is rotated in the pan direction with respect to base 4 such that the longitudinal direction of cutout 16 is parallel to the front-rear direction (Y-axis direction) of imaging device 2. At this time, as illustrated in FIGS. 13 and 14, substantially U-shaped first cutout 62 (an example of a recess) formed in an upper end (an end on a side facing first housing 6) of base 4 and substantially U-shaped second cutout 64 (an example of a recess) formed in a lower end (an end on a side facing base 4) of first housing 6 are disposed so as to be adjacent to each other in a direction (Z-axis direction) intersecting the pan direction. That is, first cutout 62 and second cutout 64 are formed between base 4 and first housing 6. Note that first cutout 62 faces the inside of imaging device 2, and second cutout 64 faces the outside of imaging device 2.

In this state, as illustrated in FIGS. 13 and 14, by inserting insertion part 54 of pan stopper 14 into second cutout 64 of first housing 6 and first cutout 62 of base 4 in a bold-like manner, insertion part 54 and each of first cutout 62 and second cutout 64 is detachably engaged with each other.

Furthermore, the pair of claw parts 56, 58 is inserted into gap 66 between the upper end of base 4 and the lower end of first housing 6, and is detachably engaged with the lower end of first housing 6. Accordingly, pan stopper 14 is detachably supported on the side surface of first housing 6.

As described above, since pan stopper 14 comes into contact with both base 4 and first housing 6, the rotation of first housing 6 in the pan direction with respect to base 4 is regulated. Furthermore, since insertion part 54 is positioned between the pair of claw parts 56, 58, the engagement between insertion part 54 and each of first cutout 62 and second cutout 64 can be stabilized.

Note that when the regulation of the rotation of first housing 6 in the pan direction with respect to base 4 is released, the user pinches left and right both ends of body 52 of pan stopper 14 with fingers and pulls pan stopper 14 away from first housing 6, whereby insertion part 54 is pulled out from first cutout 62 and second cutout 64. As a result, the engagement between insertion part 54 and each of first cutout 62 and second cutout 64 is released, and second housing 8 can rotate in the tilt direction with respect to first housing 6.

4. Advantageous Effects

In the present exemplary embodiment, imaging device 2 includes imaging unit 10 that captures an object, first housing 6 (an example of a first member), second housing 8 (an example of a second member) that supports imaging unit 10 and is rotatably supported in a tilt direction (an example of a predetermined direction) with respect to first housing 6 in order to change an imaging direction of imaging unit 10, and tilt stopper 12 (an example of a regulation member) that contacts both first housing 6 and second housing 8 to regulate rotation of second housing 8 in the tilt direction with respect to first housing 6.

Furthermore, imaging device 2 includes imaging unit 10 that captures an object, base 4 (an example of a first member), first housing 6 (an example of a second member) that supports imaging unit 10 and is rotatably supported in a pan direction (an example of a predetermined direction) with respect to base 4 in order to change an imaging direction of imaging unit 10, and pan stopper 14 (an example of a regulation member) that contacts both base 4 and first housing 6 to regulate rotation of first housing 6 in the pan direction with respect to base 4.

Accordingly, it is possible to regulate unintended tilt rotation of second housing 8 with respect to first housing 6 or unintended pan rotation of first housing 6 with respect to base 4.

Furthermore, in the present exemplary embodiment, a recess is formed between first housing 6 and second housing 8 (between base 4 and first housing 6). Tilt stopper 12 (pan stopper 14) has insertion part 28 (54) to be inserted into the recess.

With this configuration, unintended tilt rotation of second housing 8 with respect to first housing 6 or unintended pan rotation of first housing 6 with respect to base 4 can be regulated with a relatively simple configuration.

Furthermore, in the present exemplary embodiment, the predetermined direction is a tilt direction. The recess is gap 48 formed between first housing 6 and second housing 8. Insertion part 28 of tilt stopper 12 has engagement hole 42 (an example of a first engagement part). First housing 6 has engagement projection 50 (an example of a second engagement part) disposed in gap 48. When insertion part 28 of tilt stopper 12 is inserted into gap 48 in a state where tilt stopper 12 is supported by second housing 8, engagement hole 42 and engagement projection 50 are detachably engaged with each other.

According to this, engagement hole 42 and engagement projection 50 can be detachably engaged with each other by a relatively simple operation of rotating second housing 8 in the tilt direction with respect to first housing 6 and inserting insertion part 28 of tilt stopper 12 into gap 48.

Furthermore, in the present exemplary embodiment, imaging unit 10 includes lens 20. Second housing 8 has opening 18 for exposing lens 20 to the outside of second housing 8. Tilt stopper 12 is detachably supported by opening 18 of second housing 8.

According to this, tilt stopper 12 can also be used as a lens cap for protecting lens 20.

Furthermore, in the present exemplary embodiment, tilt stopper 12 includes claw part 24 (26). In a state where tilt stopper 12 is detachably supported by opening 18 of second housing 8, claw part 24 (26) is detachably engaged with first housing 6.

Accordingly, it is possible to prevent tilt stopper 12 from falling off from opening 18 of second housing 8.

Furthermore, in the present exemplary embodiment, tilt stopper 12 includes pressed part 30. When pressed part 30 is pressed by an external force, the engagement between engagement hole 42 and engagement projection 50 is released by bending of insertion part 28.

According to this, the engagement between engagement hole 42 and engagement projection 50 can be released by a relatively simple operation of pressing pressed part 30.

Furthermore, in the present exemplary embodiment, the predetermined direction is a pan direction. The recess includes first cutout 62 formed in base 4 and second cutout 64 formed in first housing 6 and adjacent to first cutout 62 in a direction intersecting the pan direction. When insertion part 54 of pan stopper 14 is inserted into first cutout 62 and second cutout 64, insertion part 54 and each of first cutout 62 and second cutout 64 are detachably engaged with each other.

According to this, by a relatively simple operation of inserting insertion part 54 of pan stopper 14 into first cutout 62 and second cutout 64, insertion part 54 and each of first cutout 62 and second cutout 64 can be detachably engaged with each other.

Furthermore, in the present exemplary embodiment, pan stopper 14 includes claw part 56 (58). In a state where insertion part 54 is inserted into first cutout 62 and second cutout 64, claw part 56 (58) is detachably engaged with first housing 6.

Accordingly, it is possible to prevent pan stopper 14 from falling off from first housing 6.

Modifications, Etc.

As described above, the above exemplary embodiment has been described as examples of the techniques disclosed in the present application. The technique according to the present disclosure is, however, not limited to the above exemplary embodiment, and is applicable to other exemplary embodiments having appropriate modifications, replacements, additions, omissions, and the like. Furthermore, a new exemplary embodiment can be made by combining the components described in the above exemplary embodiment.

Accordingly, hereinafter, another exemplary embodiment is exemplified.

In the above exemplary embodiment, the pan rotation is regulated by detachably engaging insertion part 54 of pan stopper 14 with each of first cutout 62 and second cutout 64, but the present disclosure is not limited thereto. For example, the pan rotation may be regulated using a frictional force between insertion part 54 of pan stopper 14 and each of first cutout 62 and second cutout 64. Similarly, the tilt rotation may be regulated using a frictional force between insertion part 28 of tilt stopper 12 and first housing 6.

Furthermore, in the above exemplary embodiment, imaging device 2 is used as a television camera, but the present disclosure is not limited thereto, and imaging device 2 may be used as, for example, a security camera or the like.

As described above, the exemplary embodiments have been described to exemplify the techniques in the present disclosure. The accompanying drawings and the detailed description have been presented for this purpose.

Accordingly, in order to exemplify the techniques described above, components illustrated or described in the accompanying drawings and the detailed description may not only include components that are essential for solving the problems, but may also include components that are not essential for solving the problems. Thus, it should not be immediately construed that those non-essential components are essential only based on the fact that those non-essential components are illustrated in the accompanying drawings or described in the detailed description.

Furthermore, since the above exemplary embodiment is intended to exemplify the technique in the present disclosure, various modifications, substitutions, additions and omissions can be performed within the scope of the claims or of equivalents of the claims.

The imaging device of the present disclosure is applicable as, for example, a PTZ camera or the like.

What is claimed is:

1. An imaging device comprising:
an imaging unit that captures an object;
a first member;
a second member that supports the imaging unit and is rotatably supported in a predetermined direction with respect to the first member in order to change an imaging direction of the imaging unit; and
a regulation member that regulates rotation of the second member in the predetermined direction with respect to the first member by coming into contact with both the first member and the second member, wherein
the first member and the second member include a recess formed between the first member and the second member,
the regulation member includes an insertion part to be inserted into the recess,
the predetermined direction is a tilt direction,
the recess is a gap formed between the first member and the second member,
the insertion part of the regulation member includes a first engagement part,
the first member includes a second engagement part disposed in the gap, and
the first engagement part and the second engagement part are detachably engaged with each other by inserting the insertion part of the regulation member into the gap in a state where the regulation member is supported by the second member.

2. The imaging device according to claim 1, wherein
the imaging unit includes a lens,
the second member includes an opening that exposes the lens to an outside of the second member, and
the regulation member is detachably supported by the opening of the second member.

3. The imaging device according to claim 2, wherein the regulation member further includes a claw part detachably engaged with the first member.

4. The imaging device according to claim 2, wherein
the regulation member further includes two claw parts detachably engaged with the first member, and
the first engagement part of the insertion part is positioned between the two claw parts.

5. The imaging device according to claim 1, further comprising a base, wherein the first member is rotatably supported in a pan direction with respect to the base.

6. The imaging device according to claim 1, wherein
the regulation member further includes a pressed part configured such that when the pressed part is pressed by an external force, the insertion part is bent to release engagement between the first engagement part and the second engagement part.

7. An imaging device comprising:
an imaging unit that captures an object;
a first member;
a second member that supports the imaging unit and is rotatably supported in a predetermined direction with respect to the first member in order to change an imaging direction of the imaging unit; and
a regulation member that regulates rotation of the second member in the predetermined direction with respect to the first member by coming into contact with both the first member and the second member, wherein
the first member and the second member include a recess formed between the first member and the second member,
the regulation member includes an insertion part to be inserted into the recess, wherein
the predetermined direction is a pan direction,
the recess includes
a first cutout formed in the first member, and
a second cutout formed in the second member and adjacent to the first cutout in a direction intersecting the pan direction, and
the insertion part and each of the first cutout and the second cutout are detachably engaged with each other by inserting the insertion part of the regulation member into the first cutout and the second cutout.

8. The imaging device according to claim 7, wherein the regulation member further includes a claw part detachably engaged with the second member.

9. The imaging device according to claim 7, wherein
the regulation member further includes two claw parts detachably engaged with the second member, and
the insertion part is positioned between the two claw parts.

* * * * *